Dec. 10, 1940.  C. L. EVANS  2,224,475

PISTON PACKING

Filed June 2, 1939

C. L. Evans
INVENTOR.

BY *CASnowReo*
ATTORNEYS.

Patented Dec. 10, 1940

2,224,475

UNITED STATES PATENT OFFICE 2,224,475

PISTON PACKING

Carroll L. Evans, Tipton, Calif.

Application June 2, 1939, Serial No. 277,100

1 Claim. (Cl. 309—1)

This invention relates to packing designed primarily for use in connection with angular pistons or plungers such as used in pumps, etc., one of the objects being to provide packing in the form of rollers positioned to engage and roll along the cooperating faces of the angular piston or plunger and of the cylinder in which it is located, these rollers being so located and constructed as to provide an effective seal useful under many conditions.

A further object is to provide packing of this character capable of withstanding extreme pressures and which will operate efficiently under varying working conditions.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing—

Figure 2:
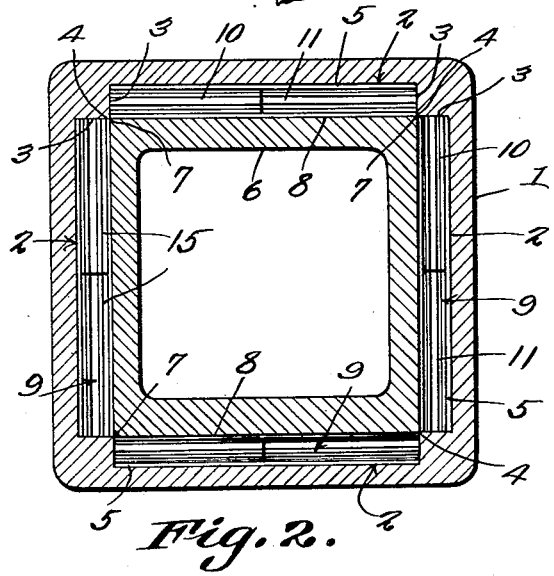
Figure 2 is a section on line 2—2, Figure 1.

Referring to the figures by characters of reference, 1 designates the cylinder or casing of the pump or other structure embodying the present improvement, the same being rectangular in transverse section as shown particularly in Figure 2 and provided in each of its inner faces, with a longitudinal recess 2 the end walls 3 of which converge at right angles to the near walls of the next adjoining recesses so as to come together along lines extending longitudinally of the casing and which are parallel, as shown at 4.

The walls of the recesses are provided, between the ends or shoulders 3 with parallel ribs 5 cooperating to form racks extending longitudinally of the recesses.

The piston 6 designed for use in the cylinder 1 is likewise rectangular in cross section and is so proportioned that its angular corners 7 will abut against and move along the corners 4 formed by the end walls or shoulders 3. The flat outer faces of the piston are formed with superposed transverse ribs 8 and the ribs on each face cooperate to form a rack extending longitudinally of the piston or plunger 6.

Figure 3:
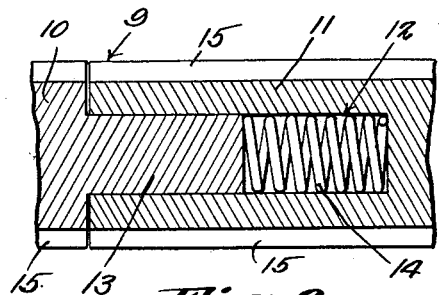
Figure 3 is an enlarged section through the meeting end portions of the two sections of one of the packing rollers.

Fitted in each of the recesses 2 is a roller 9 made up of alined sections 10 and 11, section 11 being formed in one end with a central bore 12 while section 10 has a stud or neck 13 projecting therefrom and slidable within the bore 12. A spring 14 is seated in the bore and bears at one end against the neck 13 while its other end bears against the inner wall of the bore as shown in Figure 3. Thus the roller 9, the normal overall length of which is substantially equal to the distance between the walls or shoulders 3 of recess 5, will be caused to press firmly against said walls or shoulders.

The roller is provided on its periphery with longitudinal ribs or teeth 15 and said roller is so proportioned that when it is positioned between the rack formed by ribs 5 and one of the racks formed by the ribs 8, it will mesh with the two racks and be supported thereby between the piston and cylinder.

Figure 1:
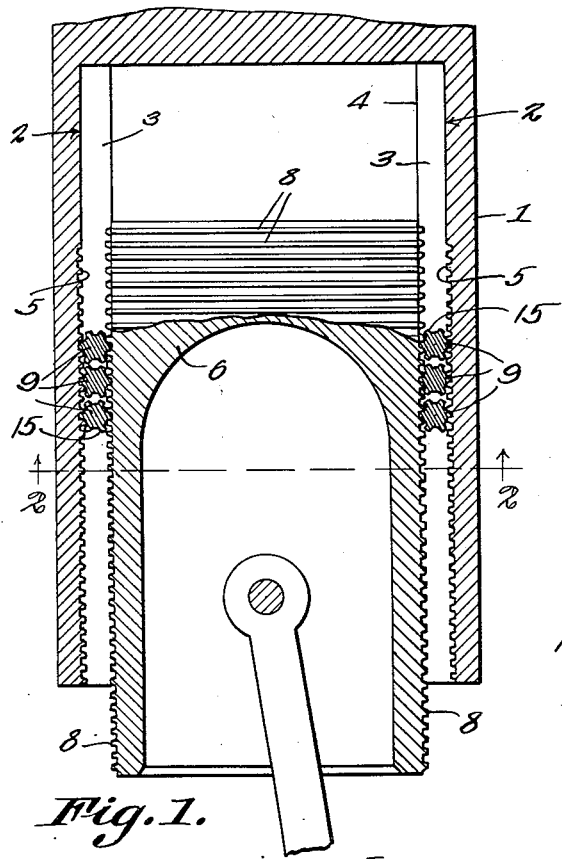
Figure 1 is a longitudinal section through a cylinder and piston provided with packing such as constitutes the present invention, a portion of the piston being shown in elevation.

As shown in Figure 1 three of these rollers have been provided at each side of the piston. It is to be understood that these rollers can be increased or reduced in number. It is essential that each roller be in constant mesh with the ribs on the cylinder and piston but that they be out of mesh with each other.

Obviously during the reciprocation of the piston or plunger 6, the rollers 9 will be caused to travel therewith and, because of their engagement with the racks 5, they will be caused to roll back and forth during such reciprocation, thereby reducing friction but providing effective packing which is useful under many working conditions.

It is understood of course that the rollers are made of metal or other suitable rigid and durable material which will not yield when subjected to pressure.

What is claimed is:

The combination with a cylinder having its walls positioned at angles to each other, and a longitudinal recess in each wall providing side shoulders, the shoulders of adjoining recesses converging to form lines extending longitudinally of the cylinder, of transverse ribs in each recess and extending to the shoulders, said ribs cooperating to provide a longitudinally extended rack, an angular piston mounted for reciprocation within the cylinder and positioned with its corners in close proximity to the meeting portions of the shoulders, transverse ribs on the piston providing longitudinal racks, and a roller within each recess having longitudinal ribs providing teeth in constant mesh with the racks in the cylinder and on the piston, said rollers being positioned with their ends in sliding contact with the shoulders and being supported and rotated by the racks to constitute packing, each of said rollers including interfitting sections and yielding means housed between the sections for holding the rolls normally pressed against the shoulders at the sides of the recess in which the roller is seated.

CARROLL L. EVANS.